US012029692B2

(12) United States Patent
Sonoda

(10) Patent No.: US 12,029,692 B2
(45) Date of Patent: Jul. 9, 2024

(54) BATHROOM COMPATIBLE WHEELCHAIR DEVICE

(71) Applicant: Sean Sonoda, Honolulu, HI (US)

(72) Inventor: Sean Sonoda, Honolulu, HI (US)

( * ) Notice: Subject to any disclaimer, the term of this patent is extended or adjusted under 35 U.S.C. 154(b) by 609 days.

(21) Appl. No.: 17/329,097

(22) Filed: May 24, 2021

(65) Prior Publication Data

US 2021/0275372 A1 Sep. 9, 2021

Related U.S. Application Data

(63) Continuation-in-part of application No. 16/113,759, filed on Aug. 27, 2018, now Pat. No. 11,013,649.

(51) Int. Cl.
*A61G 5/10* (2006.01)

(52) U.S. Cl.
CPC .......... *A61G 5/1002* (2013.01); *A61G 5/1045* (2016.11); *A61G 5/1091* (2016.11)

(58) Field of Classification Search
CPC .................................................... A61G 5/1002
See application file for complete search history.

(56) References Cited

U.S. PATENT DOCUMENTS

D339,315 S 9/1993 Lindkvist
5,577,753 A * 11/1996 Pociask .................... A61G 5/08 280/250.1
6,209,901 B1 4/2001 Patel
2009/0144891 A1 6/2009 Peng
2012/0090086 A1 4/2012 Melone
2013/0305447 A1 11/2013 Williams
2014/0042727 A1 2/2014 Musham

FOREIGN PATENT DOCUMENTS

CN 204839984 U * 12/2015
CN 112190406 A * 1/2021 ............. A47K 17/02
CN 219896170 U * 10/2023
JP 2009172108 A * 8/2009
JP 2010268872 A * 12/2010
WO WO-2015098134 A1 * 7/2015 ........... A61G 5/1002

* cited by examiner

*Primary Examiner* — Kevin Hurley

(57) ABSTRACT

A bathroom compatible wheelchair device includes a wheelchair frame and a seat frame coupled to the wheelchair frame. The seat panel is coupled to the seat frame. The seat panel is movable between a closed position and an open position. The seat panel is positioned in a seat portion of the seat frame and has height of at least 20.0 inches when in the closed position. The seat panel is positioned over a toilet when the wheelchair frame is positioned around the toilet. The seat portion of the seat frame has an opening. The seat panel covers an opening in the seat portion of the seat frame when the seat panel is positioned in the closed position. The opening is exposed when the seat panel is positioned in the open position to allow the disabled person's waste to be deposited into the toilet through the opening.

10 Claims, 8 Drawing Sheets

BATHROOM COMPATIBLE WHEELCHAIR DEVICE

CROSS-REFERENCE TO RELATED APPLICATIONS

This application is a continuation in part of U.S. application Ser. No. 16/113,759 filed Aug. 27, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheelchair devices and more particularly pertains to a new wheelchair device for exposing an opening in a seat portion to facilitate use of a toilet by a disabled person.

(2) Description of Related Art Including Information Disclosed Under 37 CFR 1.97 and 1.98

The prior art relates to wheelchair devices which lack an efficient structural configuration to expose an opening to allow use of a toilet without having to fully exit a wheelchair.

BRIEF SUMMARY OF THE INVENTION

An embodiment of the disclosure meets the needs presented above by generally comprising a wheelchair frame and a seat frame coupled to the wheelchair frame. The seat panel is coupled to the seat frame. The seat panel is movable between a closed position and an open position. The seat panel is positioned in a seat portion of the seat frame and has height of at least 20.0 inches when in the closed position. The seat panel is positioned over a toilet when the wheelchair frame is positioned around the toilet. The seat portion of the seat frame has an opening. The seat panel covers an opening in the seat portion of the seat frame when the seat panel is positioned in the closed position. The opening is exposed when the seat panel is positioned in the open position to allow the disabled person's waste to be deposited into the toilet through the opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
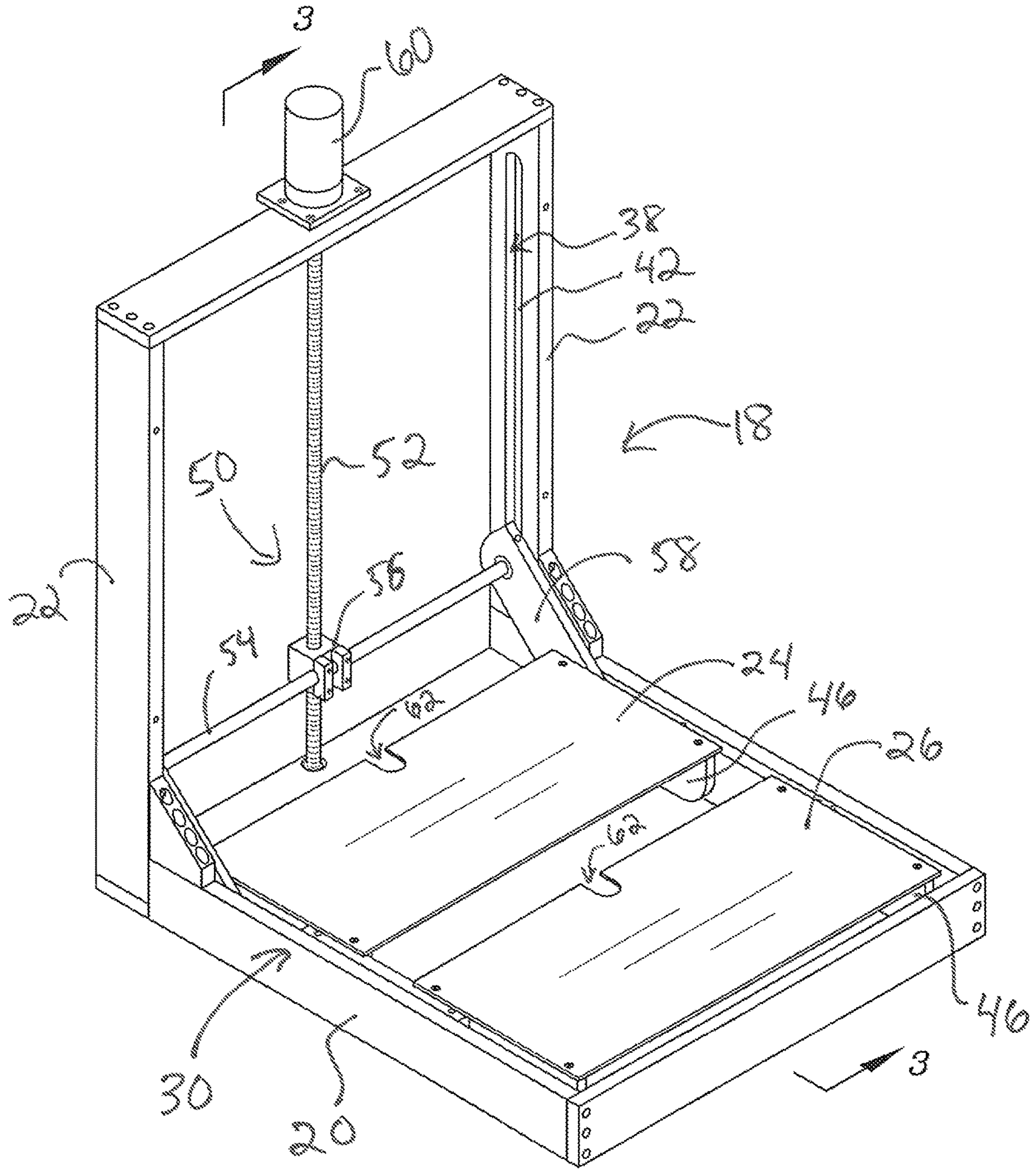
FIG. 1 is a top front side view of a seat from and shuttle of a bathroom compatible wheelchair device according to an embodiment of the disclosure.
Figure 2:
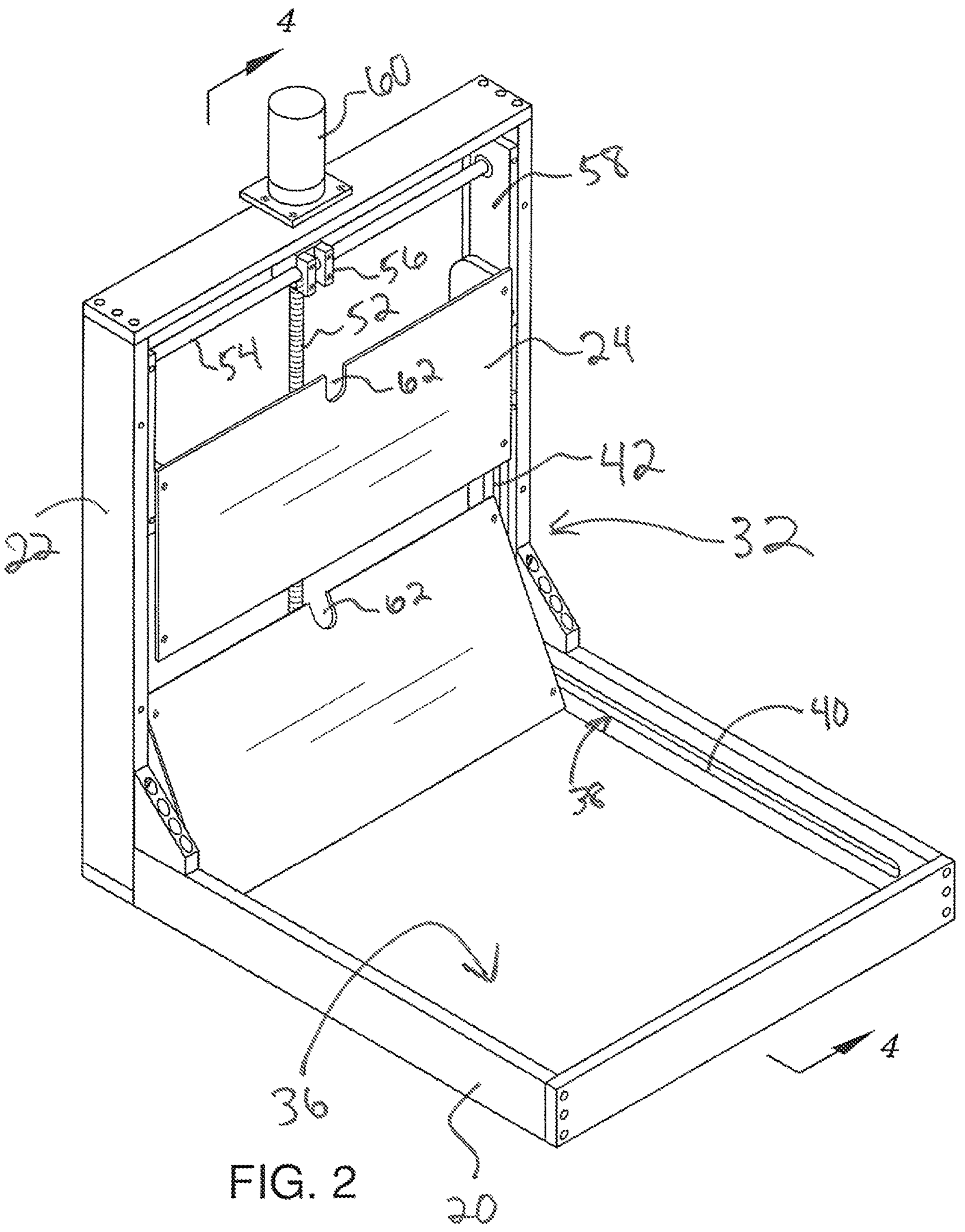
FIG. 2 is a top front side perspective view of an embodiment of the disclosure in an open configuration.
Figure 3:
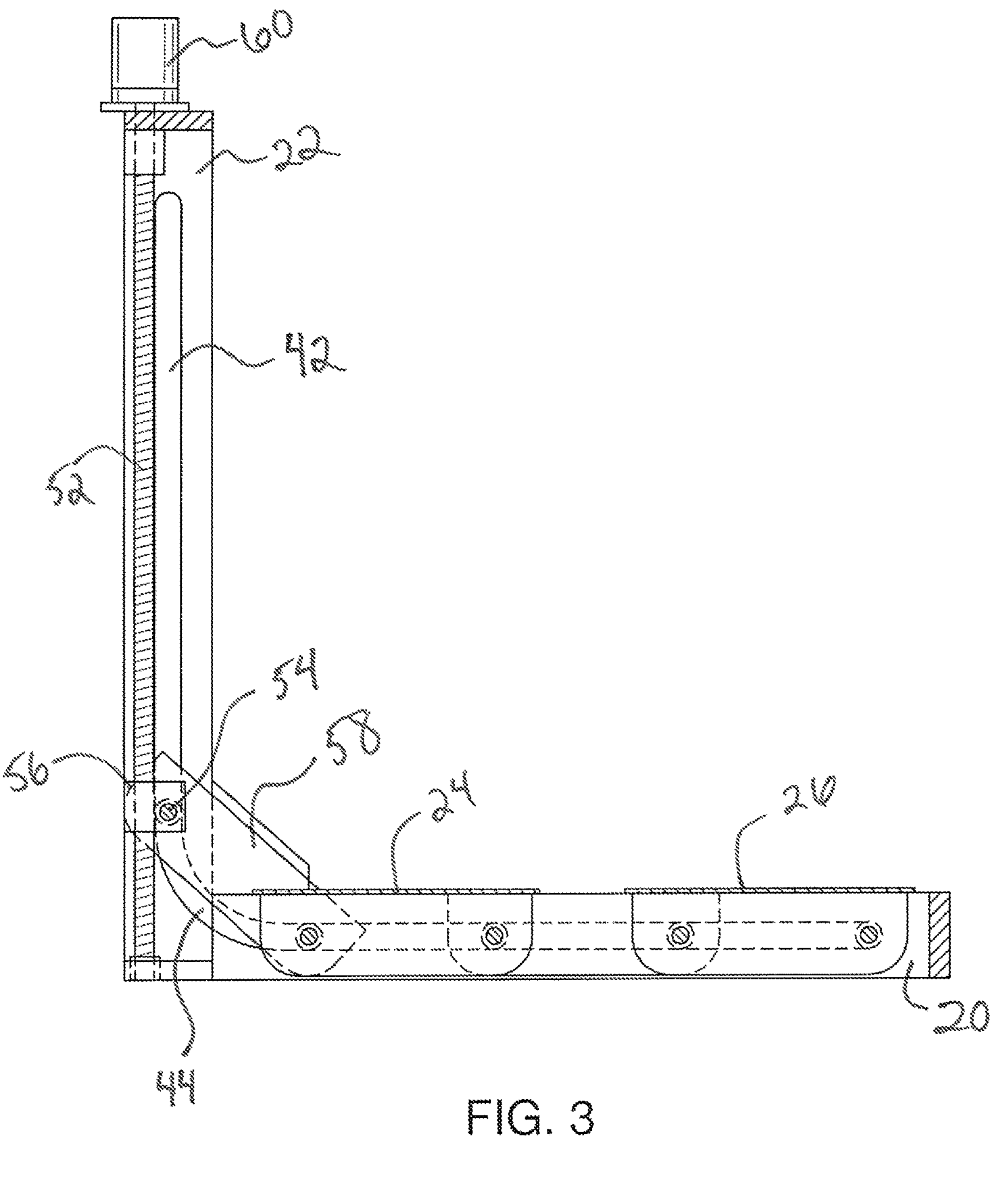
FIG. 3 is a cross-sectional view of an embodiment of the disclosure taken along line 3-3 of FIG. 1.
Figure 4:
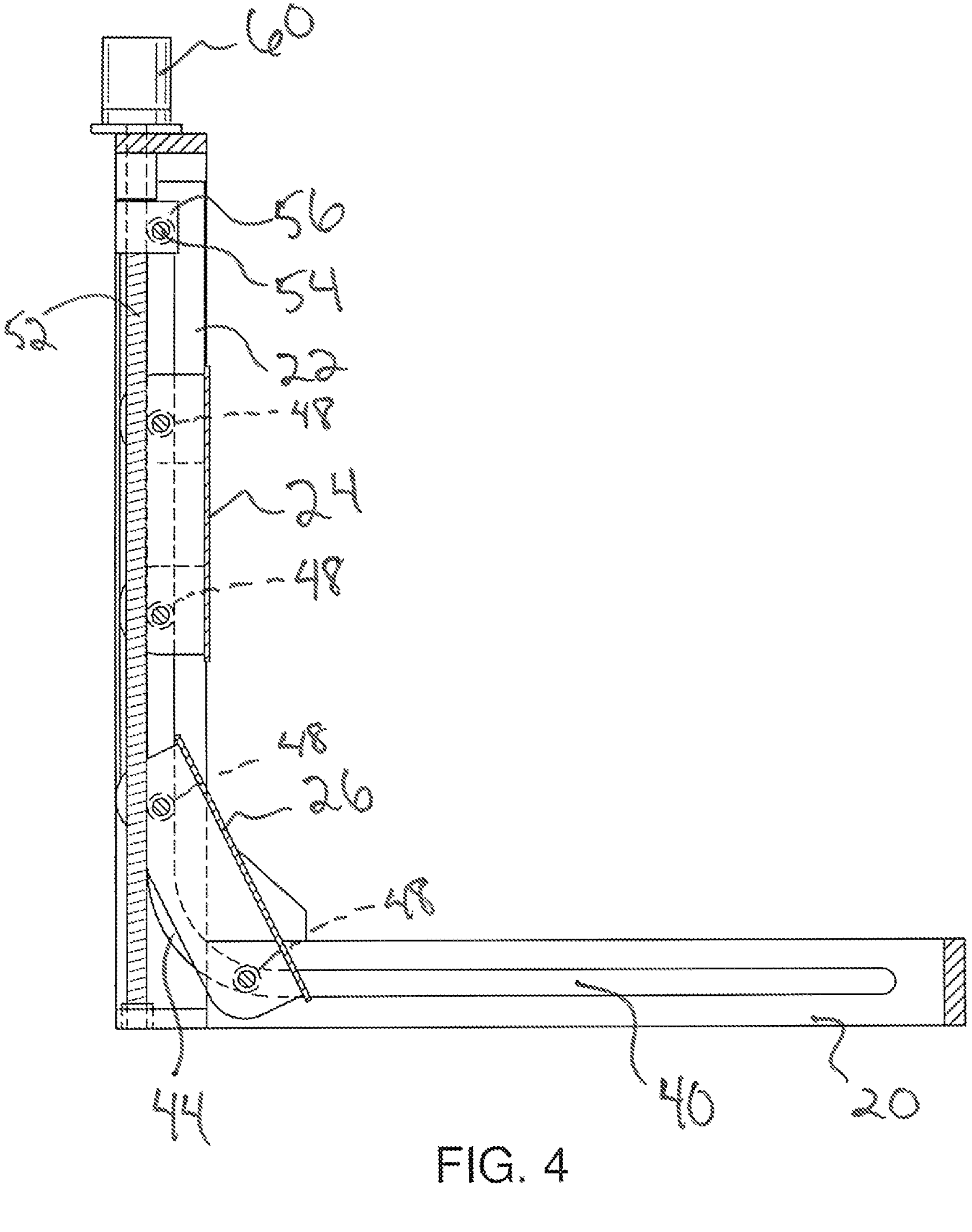
FIG. 4 is a cross-sectional view of an embodiment of the disclosure taken along line 4-4 of FIG. 2.
Figure 5:
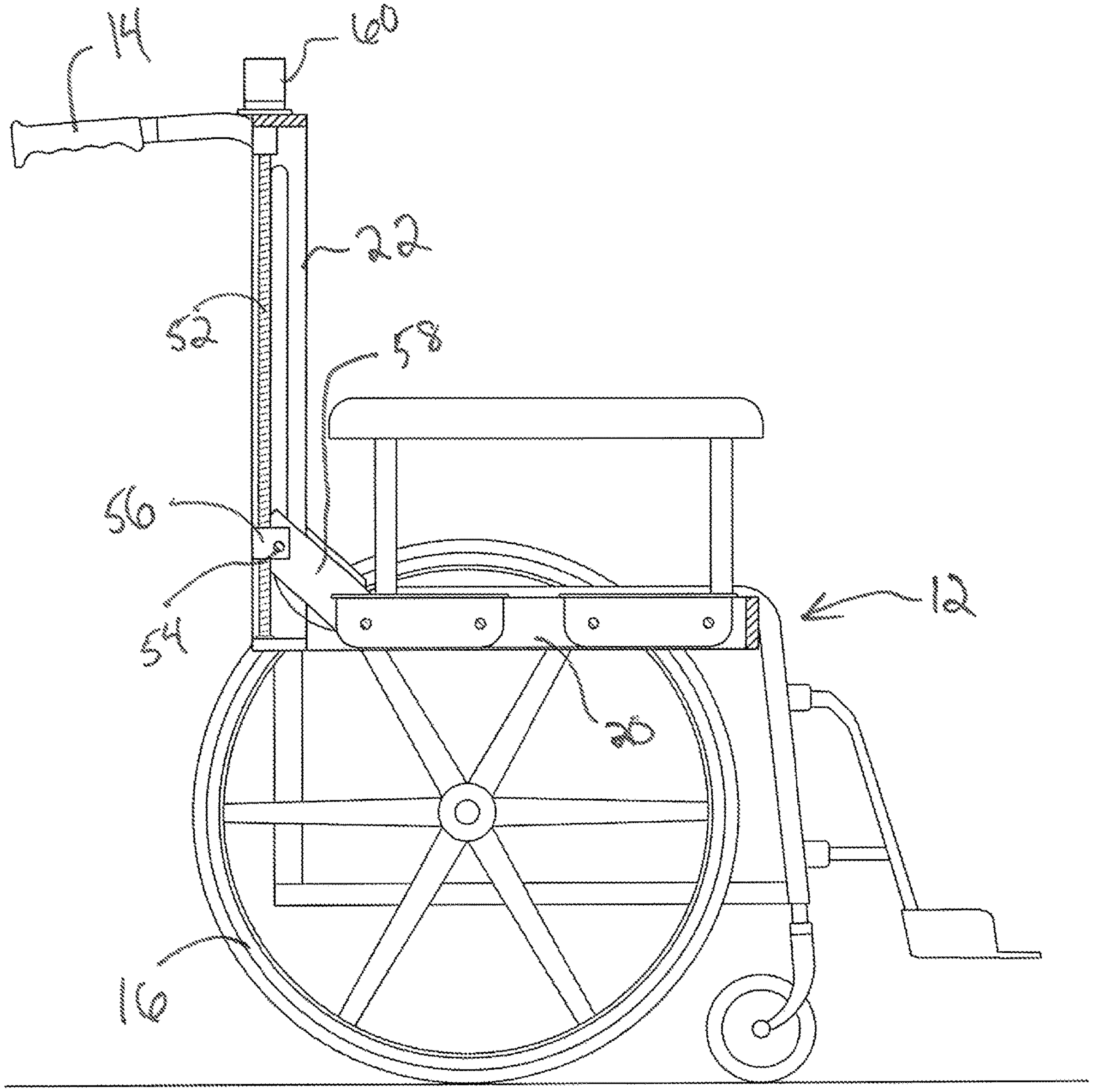
FIG. 5 is a cross-sectional view similar to FIG. 3 of an embodiment of the disclosure.
Figure 6:
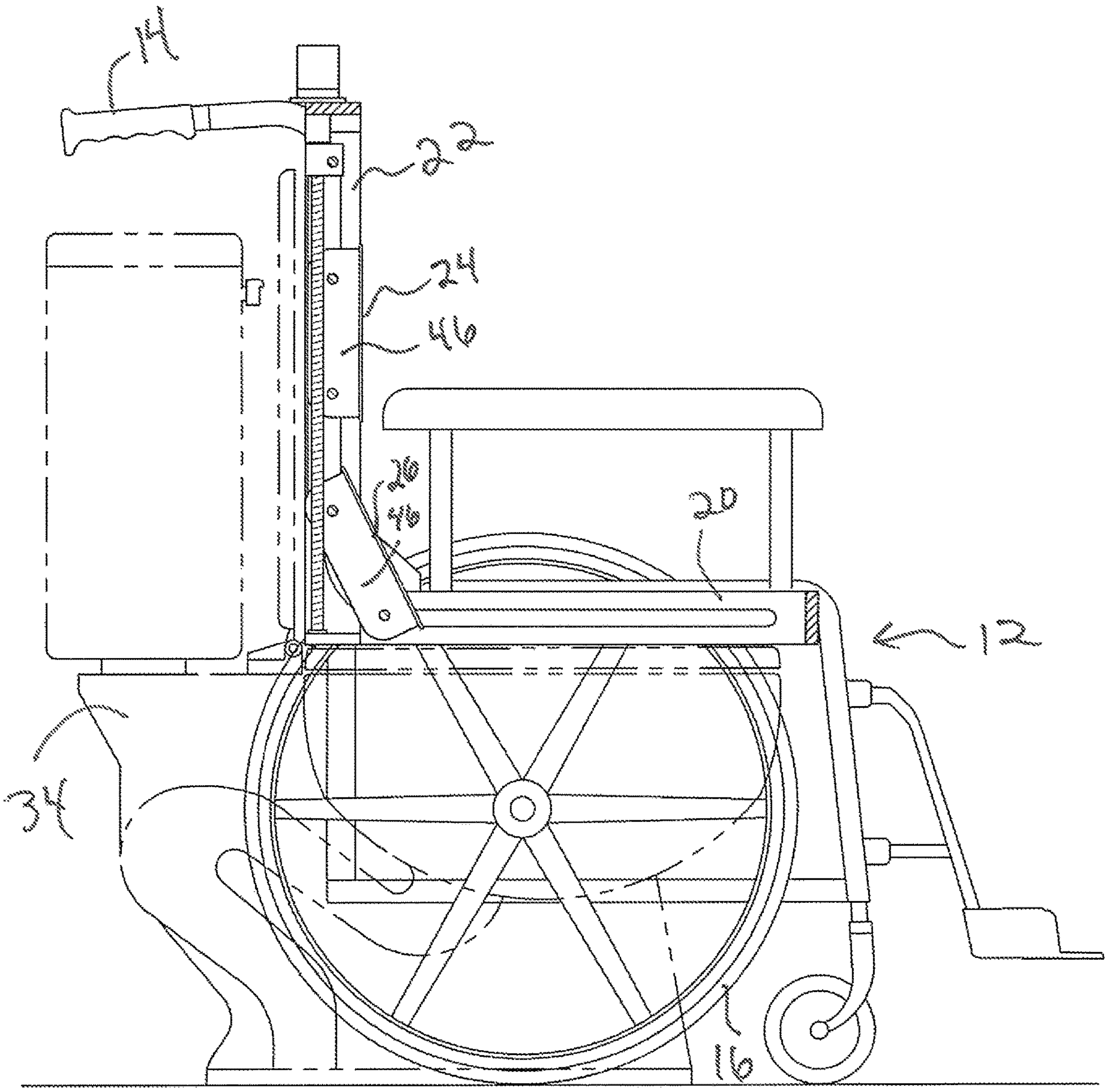
FIG. 6 is a cross-sectional view of an embodiment of the disclosure in use similar to FIG. 4.
Figure 7:
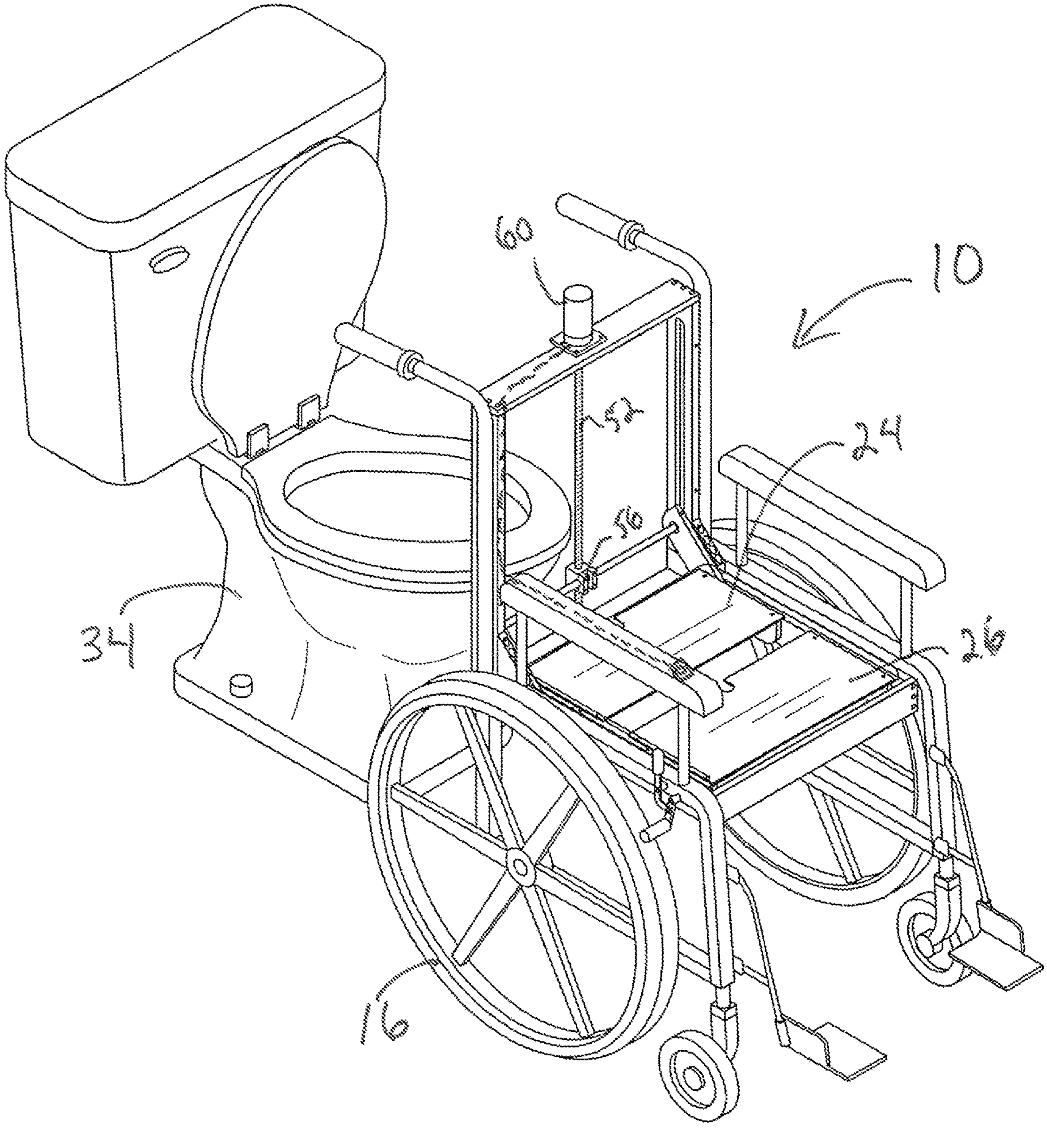
FIG. 7 is a top front side perspective view of an embodiment of the disclosure.
Figure 8:
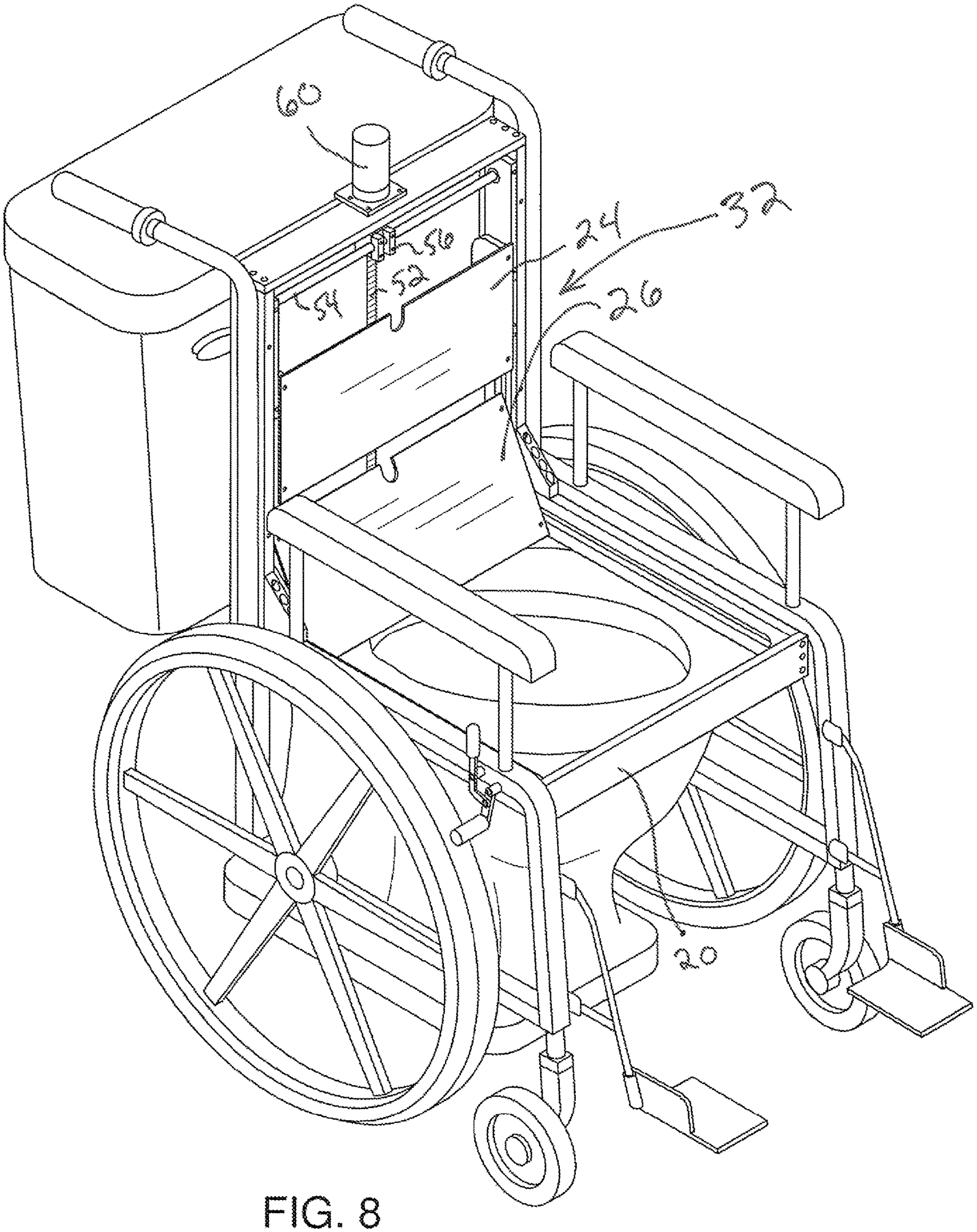
FIG. 8 is a top front side perspective view of an embodiment of the disclosure in use.

With reference now to the drawings, and in particular to FIGS. 1 through 8 thereof, a new wheelchair device embodying the principles and concepts of an embodiment of the disclosure and generally designated by the reference numeral 10 will be described.

As best illustrated in FIGS. 1 through 8, the bathroom compatible wheelchair device 10 generally comprises a wheelchair frame 12. The wheelchair frame 12 has handles 14 and attached wheels 16 as in a convention wheelchair. A seat frame 18 is coupled to the wheelchair frame 12. The seat frame 18 includes a seat portion 20 and a back portion 22. A first seat panel 24 is coupled to the seat frame 18. A second seat panel 26 is also coupled to the seat frame 18. The second seat panel 26 is coupled to the first seat panel 24 wherein the first seat panel 24 and the second seat panel 26 are movable together relative to the seat frame 18. The first seat panel 24 is spaced from the second seat panel 26 wherein the first seat panel 24 and the second seat panel 26 are configured to inhibit pinching of a disabled person between the first seat panel 24 and the second seat panel 26 during use of the device 10. The first seat panel 24 and the second seat panel 26 are movable between a closed position 30 and an open position 32. The first seat panel 24 is positioned above the second seat panel 26 when the first seat panel 24 and second seat panel 26 are in the open position 32. The first seat panel 24 is positioned perpendicular to the seat portion 20 of the seat frame 18 when in the open position 32. The first seat panel 24 is positioned in the seat portion 20 of the seat frame 18 when in the closed position 30. The second seat panel 26 is angled between the seat portion 20 and the back portion 22 such that the second seat panel 26 extends upwardly and rearwardly from the seat portion 20 of the seat frame 18 when in the open position 32.

The first seat panel 24 and the second seat panel 26 are configured to have a height of at least 20.0 inches above a ground surface when in the closed position 30. Thus, the first seat panel 24 and the second seat panel 26 are configured to be positioned over a toilet 34 compliant with the American's With Disabilities Act (ADA) when the wheelchair frame 12 is positioned around the toilet 34. The seat portion 20 of the seat frame 18 has an opening 36 extending therethrough. The first seat panel 24 and the second seat panel 26 substantially cover the opening 36 when positioned in the closed position 30 to support a disabled person on the seat frame 18. The opening 36 is exposed when the first seat panel 24 and the second seat panel 26 are positioned in the open position 32 wherein the opening 36 is configured to be aligned with the toilet 34 to allow the disabled person's waste to be deposited into the toilet 34 through the opening 36.

The seat frame 18 has a pair of lateral tracks 38 extending along the seat portion 20 and the back portion 22. The lateral tracks 38 each have a seat section 40 and a back section 42 joined by a curved section 44. Each of the first seat panel 24 and the second seat panel 26 has a respective pair of lateral walls 46. Each of the lateral walls 46 of the first seat panel 24 and the second seat panel 26 is engaged to a respective one of the lateral tracks 38 by pegs 48. The pegs 48 may be rollers to facilitate movement of the first seat panel 24 and second seat panel 26.

A shuttle 50 is coupled to the seat frame 18 and the first seat panel 24 for moving the first seat panel 24 and the second seat panel 26 between the closed position 30 and the open position 32. The shuttle 50 includes a shaft 52 coupled to the back portion 22 of the seat frame 18. The shaft 52 is oriented perpendicular to the seat portion 22 of the seat frame 18. The shaft 52 is threaded. A bar 54 is coupled to the shaft 52 by a bus block 56. Opposite ends 58 of the bar 54 are positioned in respective ones of the pair of lateral tracks 38 in the back section 42 along the back portion 22 of the seat frame 18. The first seat panel 24 is coupled to the bar 54 such that the first seat panel 24 and second seat panel 26 are moved between the closed position 30 and the open position 32 by the bar 54 being moved in the lateral tracks 38. The shuttle 50 further includes a pair of spacer panels 58. Each spacer panel 58 is coupled to a respective one of the lateral walls 46 wherein the bar 54 is spaced from the first seat panel 24 by the spacer panels 58. A motor 60 is coupled to the seat frame 18. The motor 60 may be centered on a top of the back portion 22. The motor 60 rotates the shaft 54. The bus block 56 is threadedly coupled to the shaft 54 wherein the bus block 56 is moved along the shaft 54 when the shaft 54 is rotated by the motor 60. The motor 60 may be replaced by a conventional hand operated mechanism for rotating the shaft 54. The motor 60 may be activated in a conventional manner by a button or the like operationally connected to the motor 60 and positioned on the wheelchair frame to be accessible to the disabled person sitting in the wheelchair. The connection may be wired or wireless. The motor 60 may also be operated by wireless connection to a smart device such as a phone or tablet which may be carried by the disabled person.

Each of a pair of slots 62 is positioned in an associated one of the first seat panel 24 and the second seat panel 26. The slot 62 of the first seat panel 24 and the second seat panel 26 is aligned with the shaft 54 wherein each slot 62 is positioned to prevent the shaft 54 from contacting the associated one of the first seat panel 24 and the second seat panel 26 as the first seat panel 24 and the second seat panel 26 are moved between the open position 32 and the closed position 30.

In use, the disabled person may position the wheelchair frame around the toilet 34 and activate the motor 60 to move the first seat panel 24 and second seat panel 26 into the open position 32 to expose the opening 36. The disabled person may then use the toilet 34 before activating the motor 60 to move the first seat panel 24 and second seat panel 26 back to the closed position 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bathroom compatible wheelchair assembly being positionable over a toilet wherein said assembly is configured to facilitate an individual to use a toilet without leaving a wheelchair, said assembly comprising:

a wheelchair frame;

a seat frame coupled to said wheelchair frame, said seat frame including a seat portion and a back portion;

a seat panel coupled to said seat frame, said seat panel being movable between a closed position and an open position, said seat panel being positioned in said seat portion of said seat from when in said closed position, said seat panel being configured to have a height of at least 20.0 inches when in said closed position wherein said seat panel is configured to be positioned over a toilet when said wheelchair is rolled over the toilet, said seat portion of said seat frame having an opening extending therethrough, said seat panel covering said opening when positioned in said closed position, said opening being exposed when said seat panel is positioned in said open position wherein said opening is aligned with the toilet when said seat portion is positioned over the toilet wherein said opening is configured to allow the disabled person's waste to be deposited into the toilet through said opening;

said seat frame having a pair of lateral tracks extending along said seat portion and said back portion;

a pair of lateral walls coupled to said seat panel, each of said lateral walls being engaged to a respective one of said lateral tracks; and a shuttle coupled to said seat panel, said shuttle moving said seat panel between said closed position and said open position.

2. The assembly of claim 1, further comprising:

said seat panel being a first seat panel; and a second seat panel, said second seat panel being coupled to said first seat panel wherein said first seat panel and said second seat panel are movable together to expose said opening.

3. The assembly of claim 2, further comprising said first seat panel being spaced from said second seat panel wherein said first seat panel and said second seat panels are configured to inhibit pinching of the disabled person between said first seat panel and said second seat panel.

4. The assembly of claim 1, wherein the shuttle comprises:

a shaft coupled to said back portion of said seat frame; and a bar being coupled to said shaft, opposite ends of said bar being positioned in respective ones of said pair of tracks along said back portion, said seat panel being coupled to said bar such that said seat panel is moved between said closed position and said open position by said bar being moved in said pair of tracks.

5. The assembly of claim 4, further comprising said shaft being oriented perpendicular to said seat portion of said frame.

6. The assembly of claim 4, further comprising a pair of spacer panels, each spacer panel being coupled to a respective one of said lateral walls wherein said bar is spaced from said seat panel by said spacer panels.

7. The assembly of claim 1, further comprising:

said shaft being threaded;

a motor coupled to said seat frame, said motor rotating said shaft; and a bus block threadedly coupled to said shaft wherein said bus block is moved along said shaft when said shaft is rotated, said bar being coupled to said bus block wherein movement of said bus block along said shaft moves said seat panel.

8. The assembly of claim 4, further comprising a slot positioned in said seat panel, said slot being aligned with said shaft wherein said slot is positioned to prevent said shaft from contacting said seat panel as said seat panel is moved between said open position and said closed position.

9. A bathroom compatible wheelchair assembly being positionable over a toilet wherein said assembly is configured to facilitate an individual to use a toilet without leaving a wheelchair, said assembly comprising:

a wheelchair frame;

a seat frame coupled to said wheelchair frame, said seat frame including a seat portion and a back portion;

a seat panel coupled to said seat frame, said seat panel being movable between a closed position and an open position, said seat panel being positioned in said seat portion of said seat from when in said closed position, said seat panel being configured to have a height of at least 20.0 inches when in said closed position wherein said seat panel is configured to be positioned over a toilet when said wheelchair is rolled over the toilet, said seat portion of said seat frame having an opening extending therethrough, said seat panel covering said opening when positioned in said closed position, said opening being exposed when said seat panel is positioned in said open position wherein said opening is aligned with the toilet when said seat portion is positioned over the toilet wherein said opening is configured to allow the disabled person's waste to be deposited into the toilet through said opening, said seat panel being a first seat panel;

a second seat panel, said second seat panel being coupled to said first seat panel wherein said first seat panel and said second seat panel are movable together to expose said opening said first seat panel being positioned above said second seat panel when said seat panels are in said open position, said first seat panel being positioned perpendicular to said seat portion of said seat frame when in said open position; and said second seat panel being angled between said seat portion and said back portion such that said second seat panel extends upwardly and rearwardly from said seat portion of said seat frame when in said open position.

10. A bathroom compatible wheelchair assembly being positionable over a toilet wherein said assembly is configured to facilitate an individual to use a toilet without leaving a wheelchair, said assembly comprising:

a wheelchair frame;

a seat frame coupled to said wheelchair frame, said seat frame including a seat portion and a back portion;

a first seat panel coupled to said seat frame;

a second seat panel coupled to said seat frame, said second seat panel being coupled to said first seat panel wherein said first seat panel and said second seat panel are movable together relative to said seat frame, said first seat panel being spaced from said second seat panel wherein said first seat panel and said second seat panels are configured to inhibit pinching of the disabled person between said first seat panel and said second seat panel, said first seat panel and said second seat panel being movable between a closed position and an open position, said first seat panel being positioned above said second seat panel when said first seat panel and said second seat panel are in said open position, said first seat panel being positioned perpendicular to said seat portion of said seat frame when in said open position, said first seat panel being positioned in said seat portion of said seat frame when in said closed position, said second seat panel being angled between said seat portion and said back portion such that said second seat panel extends upwardly and rearwardly from said seat portion of said seat frame when in said open position;

said first seat panel and said second seat panel being configured to have a height of at least 20.0 inches when in said closed position wherein said first seat panel and said second seat panel are configured to be positioned over a toilet when said wheelchair frame is positioned around the toilet, said seat portion of said seat frame having an opening extending therethrough, said first seat panel and said second seat panel covering said opening when positioned in said closed position, said opening being exposed when said first seat panel and said second seat panel are positioned in said open position wherein said opening is configured to be aligned with the toilet to allow the disabled person's waste to be deposited into the toilet through said opening;

said seat frame having a pair of lateral tracks extending along said seat portion and said back portion;

each of said first seat panel and said second seat panel having a respective pair of lateral walls, each of said lateral walls of said first seat panel and said second seat panel being engaged to a respective one of said lateral tracks;

a shuttle coupled to said first seat panel for moving said first seat panel and said second seat panel between said closed position and said open position said shuttle comprising a shaft coupled to said back portion of said seat frame, said shaft being oriented perpendicular to said seat portion of said frame, said shaft being threaded, a bar being coupled to said shaft, opposite ends of said bar being positioned in respective ones of said pair of tracks along said back portion, said first seat panel being coupled to said bar such that said first seat panel and said second seat panel are moved between said closed position and said open position by said bar being moved in said pair of tracks, a pair of spacer panels, each spacer panel being coupled to a respective one of said lateral walls wherein said bar is spaced from said first seat panel by said spacer panels, and a motor coupled to said seat frame, said motor rotating said shaft;

a bus block threadedly coupled to said shaft wherein said bus block is moved along said shaft when said shaft is rotated, said bar being coupled to said bus block wherein movement of said bus block along said shaft moves said first seat panel and said second seat panel; and a pair of slots, each slot being positioned in an associated one of said first seat panel and said second seat panel, said slot of said first seat panel and said second seat panel being aligned with said shaft wherein said slot is positioned to prevent said shaft from contacting said associated one of said first seat panel and said second seat panel as said first seat panel and said second seat panel are moved between said open position and said closed position.

* * * * *